US012629835B2

(12) United States Patent
Kurihara

(10) Patent No.: US 12,629,835 B2
(45) Date of Patent: May 19, 2026

(54) MANAGEMENT DEVICE FOR MANAGING ROBOT OPERATION PROGRAM, NETWORK SYSTEM, AND METHOD

(71) Applicant: Fanuc Corporation, Minamitsuru-gun (JP)

(72) Inventor: Shinji Kurihara, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 123 days.

(21) Appl. No.: 18/568,965

(22) PCT Filed: Jun. 29, 2021

(86) PCT No.: PCT/JP2021/024585
§ 371 (c)(1),
(2) Date: Dec. 11, 2023

(87) PCT Pub. No.: WO2023/276003
PCT Pub. Date: Jan. 5, 2023

(65) Prior Publication Data
US 2024/0278429 A1     Aug. 22, 2024

(51) Int. Cl.
B25J 13/00 (2006.01)
B25J 9/16 (2006.01)
B25J 19/06 (2006.01)

(52) U.S. Cl.
CPC ........... B25J 9/1674 (2013.01); B25J 9/1661 (2013.01); B25J 13/006 (2013.01); B25J 19/061 (2013.01)

(58) Field of Classification Search
CPC ...... B25J 9/1674; B25J 9/1661; B25J 13/006; B25J 19/061; B25J 19/06
See application file for complete search history.

(56) References Cited

U.S. PATENT DOCUMENTS

2008/0216066 A1     9/2008   Oh
2013/0245792 A1     9/2013   Anzai et al.
(Continued)

FOREIGN PATENT DOCUMENTS

CN        101467129 A     6/2009
CN        104011612 A     8/2014
(Continued)

OTHER PUBLICATIONS

International Search Report and Written Opinion for International Application No. PCT/JP2021/024585, dated Sep. 14, 2021, 5 pages.

*Primary Examiner* — Adam R Mott
*Assistant Examiner* — Heather J Keniry
(74) *Attorney, Agent, or Firm* — BUCHANAN INGERSOLL & ROONEY PC

(57) ABSTRACT

A management device includes: a data acquisition unit for acquiring modification information indicating a modification that has been applied to an operation program, and execution information indicating that the operation program has been executed in order to operate a robot; an input receiving unit for receiving an input for authorizing the modification information acquired by the data acquisition unit; an authorization determination unit for determining, when the data acquisition unit has acquired the execution information, whether the modification information for the operation program being executed has been authorized; and a process execution unit for executing a predetermined accident prevention process if the authorization determination unit 66 has determined that the modification information has not been authorized.

7 Claims, 4 Drawing Sheets

(56) References Cited

U.S. PATENT DOCUMENTS

| | | | |
|---|---|---|---|
| 2016/0008976 | A1 | 1/2016 | Nagatsuka et al. |
| 2017/0113348 | A1 | 4/2017 | Monceaux et al. |
| 2017/0308052 | A1 | 10/2017 | Kajiyama |
| 2022/0203539 | A1* | 6/2022 | Touma .................. B25J 13/006 |
| 2024/0293932 | A1* | 9/2024 | Willför ................. B25J 9/1664 |

FOREIGN PATENT DOCUMENTS

| | | | |
|---|---|---|---|
| CN | 108536486 | A | 9/2018 |
| JP | 2016016488 | A | 2/2016 |
| JP | 2017517800 | A | 6/2017 |
| JP | 2017199077 | A | 11/2017 |

\* cited by examiner

MANAGEMENT DEVICE FOR MANAGING ROBOT OPERATION PROGRAM, NETWORK SYSTEM, AND METHOD

CROSS REFERENCE TO RELATED APPLICATIONS

This is the U.S. National Phase application of PCT/JP2021/024585, filed Jun. 29, 2021 the disclosures of this application being incorporated herein by reference in its entirety for all purposes.

FIELD OF THE INVENTION

The present disclosure relates to a management device, a network system, and a method for managing an operation program of a robot.

BACKGROUND OF THE INVENTION

A known program correction device supplies a corrected portion to a robot control device when a robot operation program is corrected (e.g., Patent Document 1).

PATENT LITERATURE

[PTL 1] JP 2016-016488 A

SUMMARY OF THE INVENTION

In the related art, in some cases, an operation program is executed without the administrator authorizing changes to the operation program. In such a case, there is a demand for a technique for reliably preventing an unauthorized operation program from causing an unexpected accident.

In one aspect of the present disclosure, a management device configured to manage an operation program of a robot includes a data acquiring unit configured to acquire change information indicating a change made to the operation program and execution information indicating that the operation program is executed to operate the robot, an input receiving unit configured to receive an input to authorize the change information acquired by the data acquiring unit, an authorization determination unit configured to determine whether or not the change information of the operation program under execution is authorized, when the data acquiring unit acquires the execution information, and a process execution unit configured to execute a predetermined accident-prevention process when the authorization determination unit determines that the change information is not authorized.

In another aspect of the present disclosure, a method of managing an operation program of a robot includes acquiring change information indicating a change made to the operation program, and execution information indicating that the operation program is executed to operate the robot, receiving an input to authorize the change information acquired by the data acquiring unit, determining whether or not the change information of the operation program under execution is authorized, when the execution information is acquired, and executing a predetermined accident-prevention process, when determining that the change information is not authorized.

According to the present disclosure, it is possible to quickly discover that an unauthorized operation program is under execution and prevent the unauthorized operation program from causing an unexpected accident. As a result, working efficiency can be improved.

DETAILED DESCRIPTION OF EMBODIMENTS OF THE INVENTION

Figure 1:
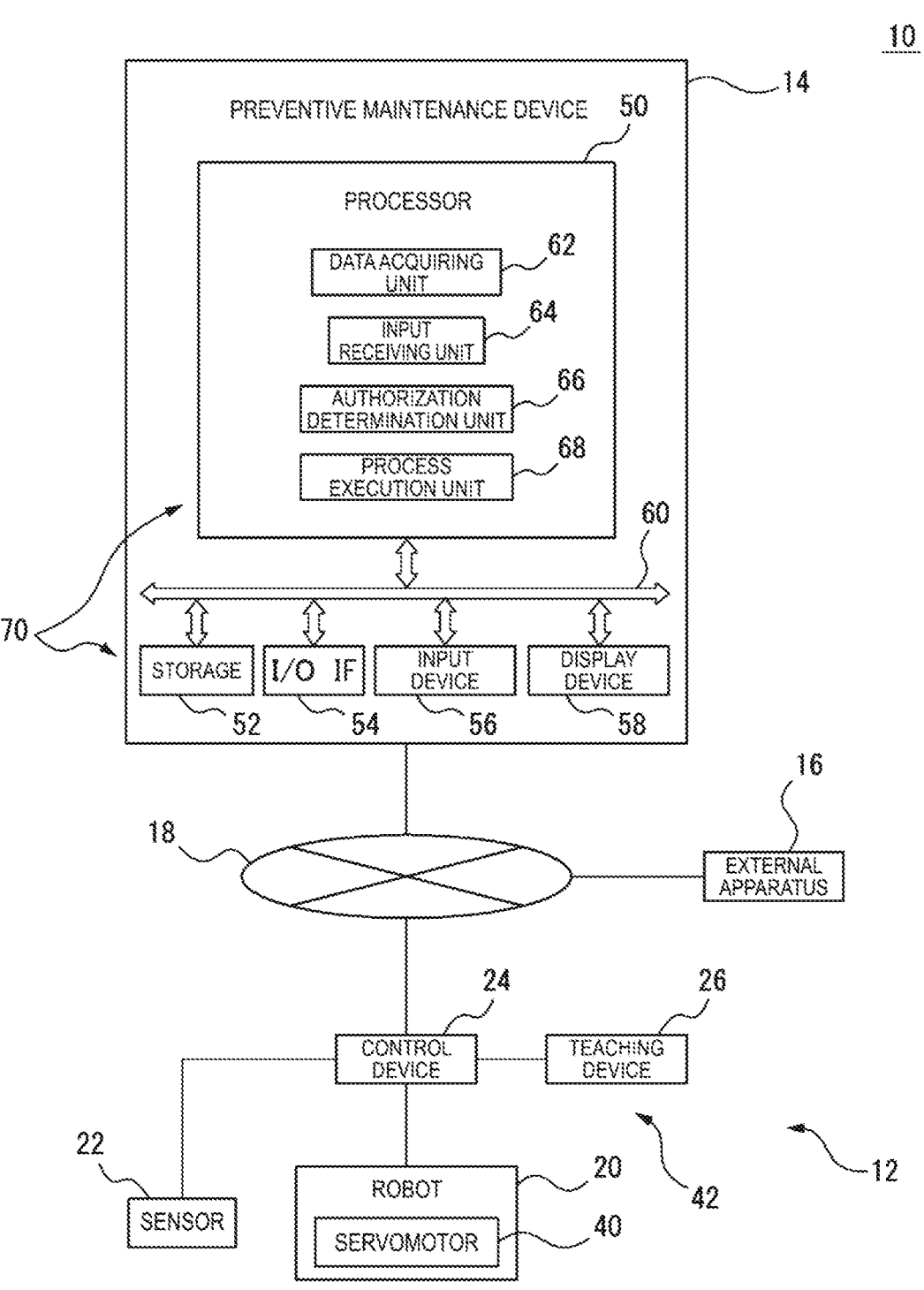
FIG. 1 is a block diagram of a network system according to an embodiment.

Hereinafter, embodiments of the present disclosure will be described in detail based on the drawings. In the various embodiments described below, the same reference numerals are given to the same elements and redundant description is omitted. First, a network system 10 according to an embodiment will be described with reference to FIG. 1. The network system 10 includes a robot system 12, a preventive maintenance device 14, an external apparatus 16, and a communication network 18.

The robot system 12 is an industrial robot system that performs predetermined work on a workpiece. The preventive maintenance device 14 obtains, from the robot system 12, operation condition data OD representing the operation condition of the robot system 12 or an abnormality identification code CD indicating an abnormality of the robot system 12 and monitors abnormalities occurring in the robot system 12 based on the operation condition data OD or the abnormality identification code CD.

The external apparatus 16 is, for example, a desktop or portable PC or a computer such as a server. The communication network 18 is, for example, a LAN (such as an Intranet) or the Internet and communicatively connects the robot system 12, the preventive maintenance device 14, and the external apparatus 16 to each other. In an example, the robot system 12 can be installed in a first building provided with a work line, the preventive maintenance device 14 can be installed in a second building separate from the first building, and the external apparatus 16 can be installed in a third building separate from the first and second buildings.

Figure 2:
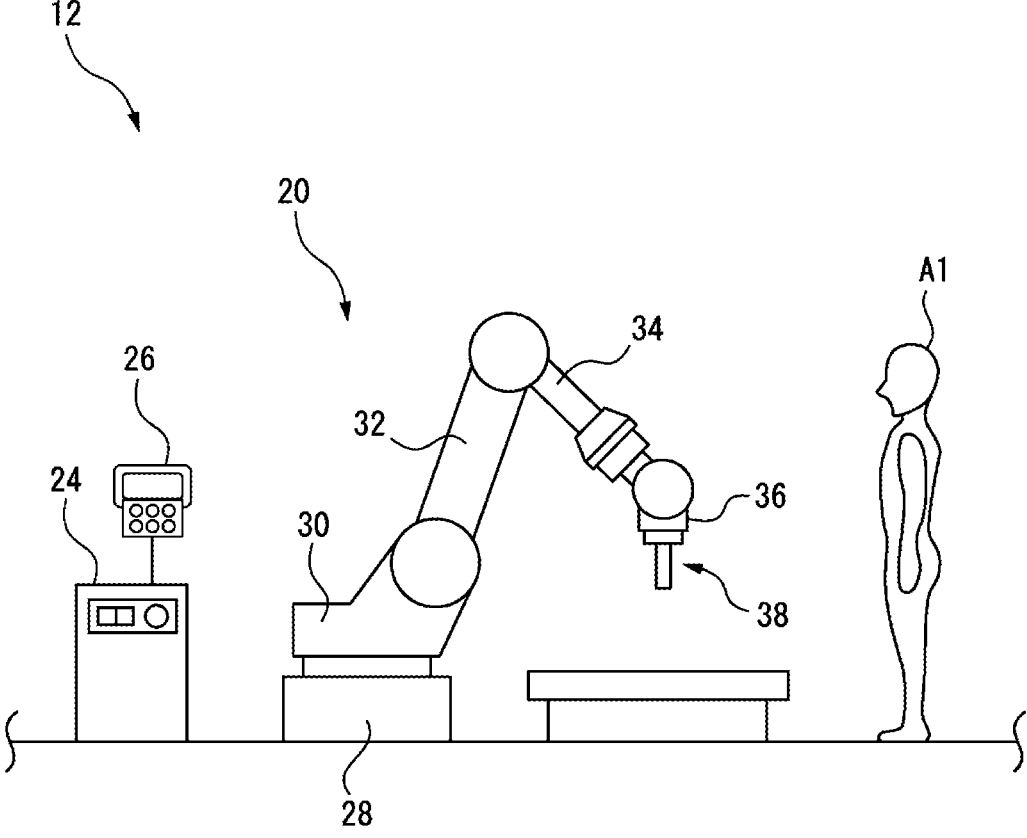
FIG. 2 is a view of a robot system according to the embodiment.

FIG. 2 illustrates an example of the robot system 12. The robot system 12 includes a robot 20, a sensor 22 (FIG. 1), a control device 24, and a teaching device 26. In the example illustrated in FIG. 2, the robot 20 is a vertical articulated robot and includes a robot base 28, a swivel body 30, a lower arm 32, an upper arm 34, a wrist 36, and an end effector 38.

The robot base 28 is fixed on the floor of the work line. The swivel body 30 is provided at the robot base 28 such that it is swingable about a vertical axis. The lower arm 32 is provided at the swivel body 30 such that it is rotatable about a horizontal axis, and the upper arm 34 is rotatably provided at a distal end of the lower arm 32.

The wrist 36 is provided at a distal end of the upper arm 34 such that it is rotatable about two axes perpendicular to each other. The end effector 38 is detachably attached to the distal end of the wrist 36 (a so-called wrist flange). The end effector 38 is, for example, a robot hand, a cutting tool, or a welding torch and performs predetermined work (such as workpiece handling, cutting, or welding) on the workpiece.

Each of the components of the robot 20 (the robot base 28, the swivel body 30, the lower arm 32, the upper arm 34, and the wrist 36) is provided with a servomotor 40 (FIG. 1). The servomotors 40 drive the movable components of the robot 20 (the swivel body 30, the lower arm 32, the upper arm 34, and the wrist 36) in response to commands from the control device 24.

The sensor 22 detects operation condition data OD of the robot system 12. The operation condition data OD includes, for example, the rotational position, rotational speed, rotational acceleration, current value, and load torque of the servomotor 40, an external force applied to the robot 20, and the voltage of a battery for operating the control device 24 (or encoders provided at the servomotors 40). The sensor 22 supplies the detected operation condition data OD to the control device 24.

The control device 24 controls the operation of the robot 20. Specifically, the control device 24 is a computer including a processor (such as a CPU or a GPU) and a storage (such as a ROM or a RAM) and generates a command for each servomotor 40 of the robot 20 in accordance with a pre-created operation program OP and operates each movable component of the robot 20 in accordance with the command such that the end effector 38 moves to a plurality of teaching points $TP_k$ (where k=1, 2, 3, . . . ) defined in the operation program OP in order. In this way, the control device 24 operates the robot 20 in accordance with the operation program OP such that the robot 20 performs predetermined work on the workpiece with the end effector 38 while moving the end effector 38 to the teaching point $TP_k$.

A command statement CM for causing the robot 20 to perform a predetermined operation is defined in the operation program OP together with operation parameters PR of the robot 20. The operation parameters PR include, for example, position data (specifically, coordinates of the robot coordinate system) of a plurality of teaching points $TP_k$ and a movement trajectory and movement speed between two teaching points $TP_k$ and $TP_{k+1}$.

The control device 24 is communicatively connected to the preventive maintenance device 14 via the communication network 18. The control device 24 (specifically, the processor) supplies execution information EI to the preventive maintenance device 14 upon executing the operation program OP to operate the robot 20. The execution information EI includes, for example, information such as a program name NM, a start time t1 and an end time t2 of the executed operation program OP. The program name NM consists of, for example, an arbitrary character string and is given by an operator A1 of the robot system 12.

The control device 24 also detects an abnormality of the robot system 12 based on operation condition data OD that the sensor 22 acquires while the robot 20 is operating in accordance with the operation program OP. For example, the control device 24 (specifically, the processor) determines that an abnormality has occurred in the robot system 12 when a value of the operation condition data OD acquired from the sensor 22 (such as the rotational position, rotational speed, rotational acceleration, current value, load torque, external force, or voltage) is greater than a predetermined reference value.

Upon detecting that an abnormality has occurred in the robot system 12, the control device 24 transmits an abnormality identification code CD identifying the abnormality to the preventive maintenance device 14 via the communication network 18. The abnormality identification code CD consists of, for example, a character string (a so-called error code) and is given individually for each of a plurality of types of abnormalities that may occur in the robot system 12

(such as malfunction of the sensor 22, interference between the robot 20 and surrounding environmental objects, and a voltage drop of the battery).

The teaching device 26 teaches an operation of the robot 20. Specifically, the teaching device 26 is, for example, a portable computer such as a teach pendant or a tablet terminal device and includes a processor (such as a CPU or a GPU), a storage (a ROM or a RAM), a display part (such as an LCD or an organic EL display), and an operating part (such as a push button or a touch sensor).

The teaching device 26 is communicatively connected to the control device 24 and can jog the robot 20 via the control device 24 in response to an input to the operating part. The operator A1 operates the operating part of the teaching device 26 to jog the robot 20 to teach the robot 20 a predetermined operation, thereby creating an operation program $OP_0$ for causing the robot 20 to perform the predetermined operation. Thus, the initial operation program $OP_0$ is created.

The teaching device 26 gives initial version information $VER_0$ to the created operation program $OP_0$. The version information $VER_0$ consists of, for example, a character string "VER.000". The teaching device 26 supplies the created operation program $OP_0$ to the control device 24 together with accompanying information such as the program name NM, the program creation time t3, and the version information $VER_0$ and also supplies them to the preventive maintenance device 14 via the communication network 18.

On the other hand, the operator A1 can operate the teaching device 26 to repeatedly make a change $CH_n$ to the created operation program $OP_0$. The change $CH_n$ made to the operation program $OP_0$ may include, for example, changing the characters or lines of the command sentence CM, changing the numerical values of the operation parameters PR (such as position data and movement speed), or adding a new command sentence CM or operation parameter PR.

Each time a first change $CH_1$, a second change $CH_2$, . . . , or an n-th change $CH_n$ is made using the teaching device 26, the operation program OP is updated from an initial operation program $OP_0$ to an operation program $OP_1$ to which the first change $CH_1$ has been made, to an operation program $OP_2$ to which the second change $CH_2$ has been made, . . . , and to an operation program $OP_n$ to which the n-th change $CH_n$ has been made.

More specifically, upon receiving an input $IPc_n$ for the n-th change $CH_n$ from the operator, the teaching device 26 (the processor) makes the change $CH_n$ to an operation program $OP_{n-1}$ currently stored in the storage of the teaching device 26 to update it to an operation program $OP_n$ in response to the input $IPc_n$. At this time, the teaching device 26 automatically assigns new version information $VER_n$ (e.g., a character string "VER.003" if n=3) to the changed operation program $OP_n$ and stores it in the storage of the teaching device 26.

The teaching device 26 then supplies change information $CHI_n$ indicating the change $CH_n$ that has been made to the preventive maintenance device 14. The change information $CHI_n$ includes, for example, accompanying information such as the program name NM, the change time t4, and the version information $VER_n$ of the changed operation program $OP_n$, and change content data $CHD_n$ indicating the content of the change $CH_n$ made.

In an example, the change content data $CHD_6$ may include only a changed (or added) portion (i.e., a changed or added command sentence CM or operation parameter PR) in the changed operation program $OP_n$. In another example, the change content data $CHD_n$ may include the changed operation program $OP_n$ itself (i.e., the entire command statement CM and operating parameters PR).

In this manner, the teaching device 26 makes a change $CH_n$ to an operation program $OP_{n-1}$ to update it to an operation program $OP_n$, thereby teaching an operation of the robot 20. The teaching device 26 transmits change information $CHI_n$ to the control device 24 together with a changed operation program $OP_n$ each time a change $CH_n$ is repeatedly made. The control device 24 stores the received operation program $OP_n$ in the storage and transmits the change information $CHI_n$ to the preventive maintenance device 14 via the communication network 18.

In the present embodiment, the control device 24 and the teaching device 26 are directly or indirectly connected to the robot 20 and the preventive maintenance device 14, communicate with each other, and supply the execution information EI and the change information $CHI_n$ to the preventive maintenance device 14 as described above. Thus, the control device 24 and the teaching device 26 constitute a communication apparatus 42 (FIG. 1) that supplies the execution information EI and the change information $CHI_n$ to the preventive maintenance device 14.

The preventive maintenance device 14 is a computer (such as a PC or a server) including a processor 50, a storage 52, an I/O interface 54, an input device 56, a display device 58, and the like. The processor 50 includes a CPU, GPU, or the like and is communicatively connected to the storage 52, the I/O interface 54, the input device 56, and the display device 58 via a bus 60.

The storage 52 includes a RAM, a ROM, or the like and temporarily or permanently stores various data used in arithmetic processing executed by the processor 50 and various data generated during the arithmetic processing. The I/O interface 54 has, for example, an Ethernet (trade name) port, a USB port, an optical fiber connector, or an HDMI (trade name) terminal and communicates data with other devices under commands from the processor 50 by wire or wirelessly. The I/O interface 54 is connected to the communication network 18.

The input device 56 includes a keyboard, a mouse, a touch panel, or the like and receives data input from the operator. The display device 58 includes a liquid crystal display, an organic EL display, or the like and displays various data. The input device 56 and the display device 58 may be provided separately from the housing of the preventive maintenance device 14 or may be integrated into the housing of the preventive maintenance device 14.

The processor 50 obtains operation condition data OD or an abnormality identification code CD from the communication apparatus 42 (specifically, the control device 24) through the communication network 18 and detects an abnormality of the robot system 12 based on the operation condition data OD or the abnormality identification code CD.

In an example, upon receiving an abnormality identification code CD from the control device 24, the processor 50 can detect that an abnormality identified by the abnormality identification code CD has occurred in the robot system 12. In another example, upon acquiring operation condition data OD, the processor 50 can detect an abnormality based on the operation condition data OD through the same abnormality detection method as that of the control device 24 described above.

In still another example, the processor 50 can also apply acquired operation condition data OD to a learning model LM constructed by machine learning to detect an abnormality of the robot system 12. This learning model LM indicates the correlation between operation condition data OD (e.g., an external force) and an abnormality occurring in the robot system 12 (e.g., interference between the robot 20 and surrounding environmental objects) and can be constructed by repeatedly giving a machine learning device a learning data set of operation condition data OD and determination data representing the presence or absence of an abnormality (e.g., by supervised learning).

The processor 50 sequentially inputs the operation condition data OD continuously obtained from the robot system 12 to the learning model LM. When there is an abnormality highly correlated with a change in operation condition data OD that has been input during a predetermined period, the learning model LM identifies and outputs the abnormality. In this manner, the processor 50 can detect an abnormality that has occurred in the robot system 12 using the learning model LM.

Using this learning model LM, the processor 50 can predict that a component of the robot system 12 will fail due to the occurrence of an abnormality. The processor 50 may also be configured to perform the functions of the machine learning device described above. Thus, the processor 50 detects an abnormality of the robot system 12 based on the operation condition data OD or the abnormality identification code CD.

On the other hand, upon obtaining the initial operation program $OP_0$ created by the teaching device 26 through the communication network 18, the processor 50 generates an authorization image $AIM_0$ for authorizing the operation program $OP_0$ and causes the display device 58 to display the authorization image $AIM_0$. For example, the authorization image $AIM_0$ includes an authorization button image.

An operator A2 (e.g., a work line designer) of the preventive maintenance device 14 can operate the input device 56 and click the authorization button image in the authorization image $AIM_0$ on the image to give the processor 50 an input $IPa_0$ to authorize the operation program $OP_0$. In response to the input $IPa_0$, the processor 50 assigns an authorization flag F1 indicating that authorization has been approved to the operation program $OP_0$ as accompanying information. Details of the authorization flag F1 will be described later.

Figure 3:
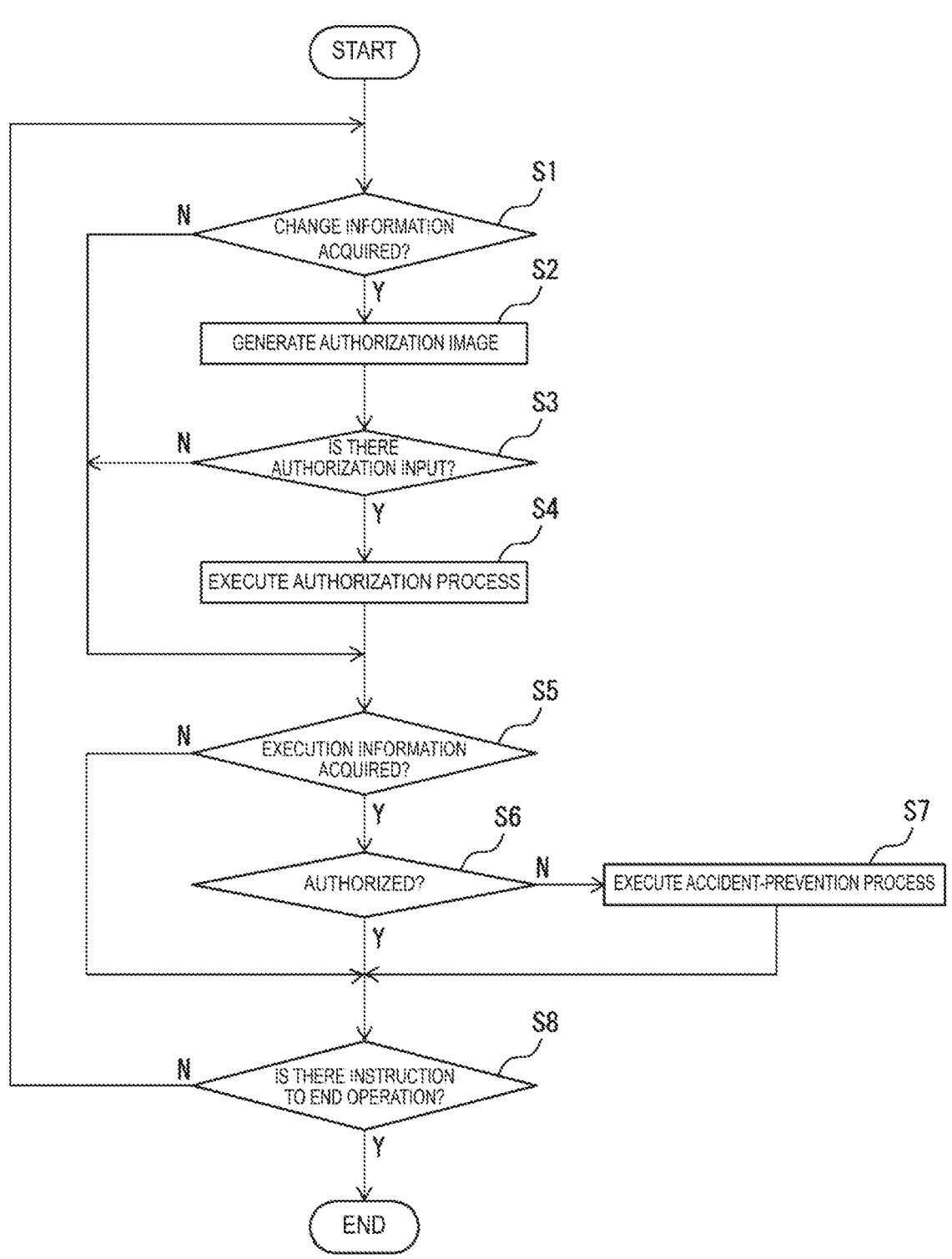
FIG. 3 is a flowchart illustrating an example of a method of managing an operation program of a robot.

The processor 50 manages the operation program OP. A method of managing the operation program OP will be described below with reference to FIG. 3. The process illustrated in FIG. 3 starts when the processor 50 has received an operation start command from the operator A2, a host controller, or a computer program.

In step S1, the processor 50 determines whether or not change information $CHI_n$ has been acquired. Specifically, the processor 50 acquires change information $CHI_n$ from the communication apparatus 42 through the communication network 18 when a change $CH_n$ has been made to the operation program $OP_{n-1}$ as described above. The processor 50 sequentially stores a plurality of pieces of change information $CHI_n$ acquired each time a change $CH_n$ is made in the storage 52 as change history data HIS. Details of the change history data HIS will be described later.

Thus, in the present embodiment, the processor 50 functions as a data acquiring unit 62 (FIG. 1) that acquires the change information $CHI_n$. If the change information $CHI_n$ has been acquired, the processor 50 determines YES and proceeds to step S2. If no change information $CHI_n$ has been acquired, the processor 50 determines NO and proceeds to step S5.

In step S2, the processor 50 generates an authorization image $AIM_n$ for authorizing the most recently acquired change information $CHI_n$ and causes the display device 58 to display the authorization image $AIM_n$. For example, the authorization image $AIM_n$ includes an authorization button image, similar to the authorization image $AIM_0$ described above. The operator A2 can operate the input device 56 and click the authorization button image in the authorization image $AIM_n$ on the image to give the processor 50 an input $IPa_n$ to authorize the change information $CHI_n$.

In step S3, the processor 50 determines whether or not an input $IPa_n$ to authorize the change information $CHI_n$ has been received. If the input $IPa_n$ has been received through the input device 56, the processor 50 determines YES and proceeds to step S4. If no input $IPa_n$ has been received, the processor 50 determines NO and proceeds to step S5. Thus, in the present embodiment, the processor 50 functions as an input receiving unit 64 (FIG. 1) that receives the input $IPa_n$ to authorize the change information $CHI_n$.

In step S4, the processor 50 executes a process of authorizing the most recently acquired change information $CHI_n$. For example, the processor 50 assigns an authorization flag F1 indicating that authorization has been approved as accompanying information about the most recent change information $CHI_n$ which is stored in the storage 52 as the change history data HIS. An example of the change history data HIS stored in the storage 52 is shown in Table 1 below.

TABLE 1

| Program Name | Version Information | Time | Stored Data | Authorization Flag |
|---|---|---|---|---|
| PRG-XYZ001 | VER.003 | 2021 Oct. 5 | $CHD_3$ | x |
| PRG-XYZ001 | VER.002 | 2021 Aug. 30 | $CHD_2$ | ○ |
| PRG-XYZ001 | VER.001 | 2021 Aug. 15 | $CHD_1$ | ○ |
| PRG-XYZ001 | VER.000 | 2021 Jun. 1 | $OP_0$ | ○ |

Table 1 schematically shows a data structure of the change history data HIS. The example shown in Table 1 shows the change history data HIS of the operation program $OP_n$ with a program name NM of "PRG-XYZ001", in which "version information", "time", "stored data", and "authorization flag" are stored in association with each other.

For example, a row with "version information" being "VER.000" corresponds to the initial operation program $OP_0$, in which the creation time t3 of the initial operation program $OP_0$ is recorded as "time" and the operation program $OP_0$ itself (i.e., the entire command statement CM and operating parameters PR) is stored as "stored data".

On the other hand, a row with "version information" being "VER.001" corresponds to change information $CHI_1$ indicating the first change $CH_1$, in which the change time t4 at which the change $CH_1$ was made is recorded as "time" and change content data $CHD_1$ (a changed portion or the changed operation program $OP_1$) is stored as "stored data".

"○" shown in the "authorization flag" column indicates that an authorization flag F1 indicating that authorization has been approved is assigned, whereas "x" in the "authorization flag" column indicates that no authorization flag F1 is assigned (or a flag indicating that authorization has not been approved is assigned). For example, in the example of Table 1, an authorization flag F1 ("authorization flag"="○") is assigned to the change information $CHI_1$ indicating the first change $CH_1$ corresponding to "VER.001", thereby indicating that the change information $CHI_1$ has been authorized by the operator A2.

On the other hand, an authorization flag F1 ("authorization flag"="x") is not assigned to change information $CHI_3$ indicating the third change $CH_3$ corresponding to "VER.003", thus indicting that the change information $CHI_3$ has not been authorized by the operator A2. The processor 50 can refer to the presence or absence of an authorization flag F1 ("○" or "x") for each piece of change information $CHI_n$ (and the initial operation program $OP_0$) stored in the change history data HIS to determine whether or not each piece of change information $CHI_n$ (and the initial operation program $OP_0$) has been authorized.

In step S5, the processor 50 determines whether or not execution information EI has been acquired. Specifically, when the control device 24 has executed the operation program OP, the processor 50 functions as a data acquiring unit 62 to acquire execution information EI from the control device 24 through the communication network 18 as described above. If the execution information EI has been acquired, the processor 50 determines YES and proceeds to step S6. If no execution information EI has been acquired, the processor 50 determines NO and proceeds to step S8.

In step S6, the processor 50 determines whether or not the change information $CHI_n$ of the operation program $OP_n$ under execution has been authorized. Specifically, the processor 50 refers to a program name NM of the operation program $OP_n$ included in the most recently acquired execution information EI and acquires change history data HIS of the operation program $OP_n$ having the program name NM from the storage 52.

Then, the processor 50 retrieves the most recent change information $CHI_n$ from the change history data HIS. For example, the processor 50 can retrieve the most recent change information $CHI_n$ from the version information $VER_n$ or the change time t4 stored in the change history data HIS. For example, in the case of the example of Table 1, the processor 50 can retrieve the change information $CHI_3$ indicating the third change $CH_3$ with "version information" being "VER.003" and "time" being "2021 Oct. 5" as the most recently acquired one.

Then, the processor 50 refers to the "authorization flag" of the most recent change information $CHI_3$ that has been retrieved and determines whether or not the change information $CHI_3$ has been authorized. In the example of Table 1, the "authorization flag" of the change information $CHI_3$ is "x" and thus the processor 50 determines NO in step S6. On the other hand, the processor 50 determines YES when the "authorization flag" of the change information $CHI_3$ is "○". The processor 50 proceeds to step S7 upon determining NO in step S6 and proceeds to step S8 upon determining YES.

In this manner, the processor 50 identifies that an operation program $OP_n$ is under execution by the execution information EI and determines whether or not change information $CHI_n$ of the operation program $OP_n$ under execution has been authorized. Thus, in the present embodiment, the processor 50 functions as an authorization determination unit 66 (FIG. 1) that determines whether or not the change information $CHI_n$ of the operation program $OP_n$ under execution has been authorized.

In step S7, the processor 50 executes an accident-prevention process AP. The processor 50 generates an alarm signal AL as an example of the accident-prevention process AP. For example, the processor 50 generates an alarm signal AL with an image displaying text "An unauthorized operation program is under execution in the robot system of the work line. Please check for the authorization as soon as possible". The processor 50 then causes the display device 58 to display the generated alarm signal AL. This allows the operator A2 to intuitively identify that an unauthorized operation program $OP_n$ is under execution in the robot system 12.

The processor 50 may supply the generated alarm signal AL to the communication apparatus 42 through the communication network 18. In this case, the control device 24 or the teaching device 26 may display the acquired alarm signal AL on a display device provided at the control device 24 or the teaching device 26. In this case, the operator A1 of the work line can also be notified that an unauthorized operation program $OP_n$ is under execution.

The processor 50 may also transmit the generated alarm signal AL, for example in the form of e-mail, to the external apparatus 16 through the communication network 18. In this case, an operator A3 of the external apparatus 16 (e.g., a manager of the work line) can also be notified that an unauthorized operation program $OP_n$ is under execution.

The processor 50 may also repeatedly notify the operator A1, A2 or A3 by repeatedly outputting the generated alarm signal AL to the display device 58, the communication apparatus 42, or the external apparatus 16. The operator A2 may arbitrarily set the timing of outputting the alarm signal AL to the display device 58, the communication apparatus 42, or the external apparatus 16 (such that it is output, for example, every hour). According to this configuration, it is possible to reliably notify the operator A1, A2 or A3 that an unauthorized operation program $OP_n$ is under execution.

The preventive maintenance device 14 may also be configured to allow the operator A2 to arbitrarily set whether or not to output the alarm signal AL to the communication apparatus 42 or the external apparatus 16. According to this configuration, the function of notifying of the alarm signal AL can be arbitrarily turned on/off according to the situation. Here, the processor 50 may generate the alarm signal AL as audio data. In this case, the processor 50 may output the alarm signal AL as a sound through a speaker (not illustrated) provided at the preventive maintenance device 14, the communication apparatus 42, or the external apparatus 16.

The processor 50 may stop the operation of the robot 20 as another example of the accident-prevention process AP. Specifically, the processor 50 transmits an emergency stop command to stop the robot 20 to the control device 24 through the communication network 18. In response to the emergency stop command, the control device 24 stops the servomotors 40 of the robot 20, thereby stopping the operation of the robot 20.

The processor 50 may cause the robot 20 to perform a retraction action as still another example of the accident-prevention process AP. Specifically, the processor 50 transmits a retraction command to retract the robot 20 to the control device 24 via the communication network 18. In response to the retraction command, the control device 24 causes the robot 20 to retract to a predetermined retraction position along a predetermined retraction path.

The processor 50 executes the accident-prevention process AP (such as generation of the alarm signal AL or an emergency stop or a retraction action of the robot 20) in step S7 upon determining that the change information $CHI_n$ has not been authorized (i.e., determining NO in step S6) as described above. Thus, in the present embodiment, the processor 50 functions as a process execution unit 68 (FIG. 1) that executes the accident-prevention process AP. After step S7, the processor 50 proceeds to step S8.

In step S8, the processor 50 determines whether or not an operation end command has been received from the operator A2, the host controller, or the computer program. The processor 50 determines YES and terminates the process illustrated in FIG. 3 when an operation end command has been received and determines NO and returns to step S1 when no operation end command has been received.

In the present embodiment, the processor 50 functions as the data acquiring unit 62, the input receiving unit 64, the authorization determination unit 66, and the process execution unit 68 and manages the operation program $OP_n$ in cooperation with the storage 52 that stores the change history data HIS of the change information $CHI_n$ as described above.

Thus, in the present embodiment, the processor 50 (the data acquiring unit 62, the input receiving unit 64, the authorization determination unit 66, and the process execution unit 68) and the storage 52 constitute a management device 70 (FIG. 1) that manages the operation program $OP_n$. That is, in the present embodiment, the management device 70 is implemented in the preventive maintenance device 14.

In the management device 70, the data acquiring unit 62 acquires change information $CHI_n$ and execution information EI, the input receiving unit 64 receives an input $IPa_n$ to authorize the change information $CHI_n$, the authorization determination unit 66 determines whether or not the change information $CHI_n$ of the operation program $OP_n$ under execution has been authorized, and the process execution unit 68 executes the accident-prevention process AP upon determining that the change information $CHI_n$ has not been authorized.

According to this configuration, it is possible to quickly discover that an unauthorized operation program $OP_n$ is under execution and prevent the unauthorized operation program $OP_n$ from causing an unexpected accident (e.g., an accident in which the work line stops due to malfunction of the robot 20, interference between the robot 20 and surrounding environmental objects, or the like). As a result, working efficiency can be improved.

In the management device 70, the process execution unit 68 generates an alarm signal AL as an example of the accident-prevention process AP. According to this configuration, it is possible to reliably notify the operator A2 that an unauthorized operation program $OP_n$ is under execution in the robot system 12.

The execution information EI may further include version information $VER_n$ or time t1 or t4 as information identifying the operation program $OP_n$ under execution. In this case, the processor 50 may compare the version information $VER_n$ or the time t1 or t4 included in the most recently acquired execution information EI with the change history data HIS (Table 1) stored in the storage 52 in step S6 described above and retrieve change information $CHI_n$ corresponding to the version information $VER_n$ or the time t1 or t4 from the change history data HIS. The processor 50 can refer to an authorization flag F1 of the change information $CHI_n$ thus retrieved to determine whether or not the change information $CHI_n$ has been authorized.

Figure 4:
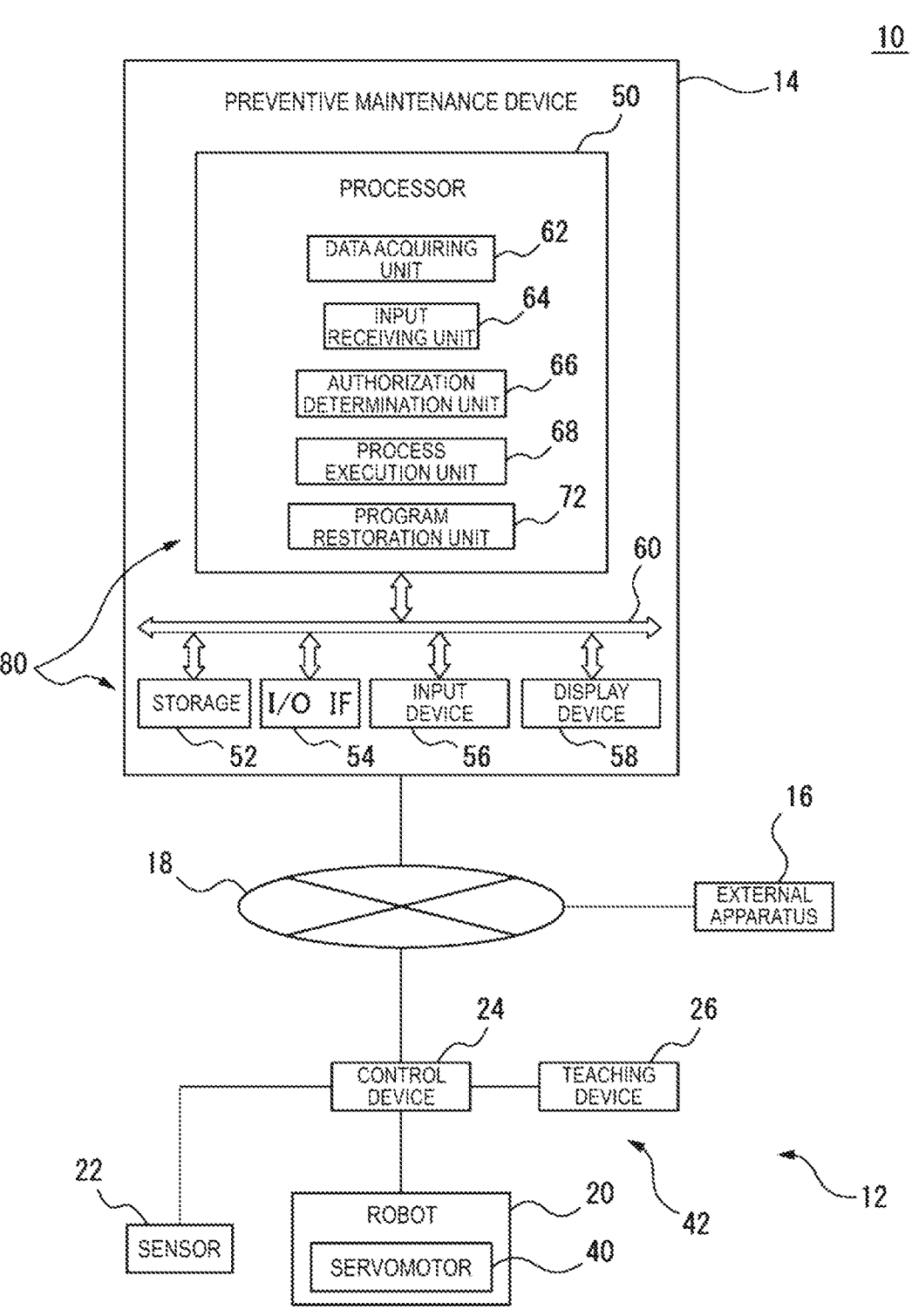
FIG. 4 is a block diagram of a network system according to another embodiment.

Next, another function of the preventive maintenance device 14 will be described with reference to FIG. 4. The processor 50 detects an abnormality of the robot system 12 based on the operation condition data OD or the abnormality identification code CD supplied during execution of the operation program $OP_n$ as described above. Such an abnormality can occur because the executed operation program $OP_n$ is inappropriate.

Thus, when an abnormality is detected, the operators A1 and A2 may desire to discard the operation program $OP_n$ to which the most recent change $CH_n$ has been made and restore an operation program $OP_m$ subjected to a change $CH_m$ ($m < n$), which has been made before the most recent change $CH_n$, stored in the change history data HIS described above. Thus, in the present embodiment, the processor 50 further functions as a program restoration unit 72 to restore the past operation program $OP_m$.

In an example, upon detecting an abnormality, the processor 50 generates a selection image SIM for selecting one of the plurality of pieces of change information $CHI_n$ stored in the change history data HIS and causes the display device 58 to display the selection image SIM. The selection image SIM includes an image of the change history data HIS as shown in Table 1 and the operator A2 can operate the input device 56 to click and select a piece of change information $CHI_m$ (specifically, "version information", "time", or "stored data") from the change history data HIS displayed in the selection image SIM on the image.

The processor 50 functions as the input receiving unit 64 to receive an input IPs to select change information $CHI_m$ indicating a change $CH_m$ from the change history data HIS through the input device 56. For example, in the case of Table 1, operation programs $OP_m$ before the most recent change $CH_3$ include the initial operation program $OP_0$, the operation program $OP_1$ to which the first change $CH_1$ has been made, and the operation program $OP_2$ to which the second change $CH_2$ has been made.

In this case, if the operator A2 selects change information $CHI_2$ (i.e., version information "VER.002") indicating the second change $CH_2$ from the change history data HIS, the processor 50 restores the operation program $OP_2$ to which the change $CH_2$ has been made, based on the change history data HIS.

In an example, if the change content data $CHD_n$ included in the change information $CHI_n$ has only a changed portion (i.e., a changed or added command sentence CM or operation parameter PR), the processor 50 can restore the operation program $OP_2$ to which the change $CH_2$ has been made, from the operation program $OP_0$ stored as "stored data" of "VER.000" in Table 1, the change content data $CHD_1$ stored as "stored data" of "VER.001" (i.e., the changed portion of the change $CH_1$), and the change content data $CHD_2$ stored as "stored data" of "VER.002" (i.e., the changed portion of the change $CH_2$).

In another example, when the change content data $CHD_n$ includes the changed operation program $OP_n$ itself (i.e., the entire command statement CM and operation parameters PR), the processor 50 can restore the operation program $OP_2$ by reading the operation program $OP_2$ stored as "stored data" of "VER.002".

In this way, the processor 50 restores the operation program $OP_m$ to which a change $CH_m$ made before the most recent change $CH_n$ has been made, based on the change history data HIS. Thus, in the present embodiment, the processor 50 functions as the program restoration unit 72 that restores the operation program $OP_m$. The processor 50 then supplies the restored operation program $OP_m$ to the communication apparatus 42 (e.g., the control device 24) via the communication network 18.

It is to be understood that when the operator A2 has selected the initial operation program $OP_0$ of "VER.000", the processor 50 can restore it by reading the operation program $OP_0$ stored as "stored data" of "VER.000". In the present embodiment, the processor 50 (the data acquiring unit 62, the input receiving unit 64, the authorization determination unit 66, the process execution unit 68, and the program restoration unit 72) and the storage 52 constitute a management device 80 (FIG. 1) that manages the operation program $OP_n$ as described above.

In the management device 80, the storage 52 stores a plurality of pieces of change information $CHI_n$, acquired by the data acquiring unit 62 each time a change $CH_n$ is repeatedly made, as change history data HST (Table 1) (step S1 described above) and the program restoration unit 72 restores an operation program $OP_m$, to which a change $CH_m$ made before the most recent change $CH_n$ has been made, based on the change history data HST.

According to this configuration, when an abnormality has occurred in the robot system 12 due to execution of the operation program $OP_n$ to which the most recent change $CH_n$ has been made, a past operation program $OP_m$ can be restored and the robot 20 can be operated in accordance with the restored operation program $OP_m$, for example, to test whether or not the abnormality can be resolved. As a result, it is possible to increase the possibility of continuing work on the work line, which can lead to an improvement in work efficiency.

In the management device 80, the input receiving unit 64 receives an input IPs to select a piece of change information $CHI_2$ from the change history data HST and the program restoration unit 72 restores the operation program $OP_2$ to which the change $CH_2$ has been made, in response to the input IPs received by the input receiving unit 64. According to this configuration, the operator A2 can arbitrarily select an operation program $OP_m$ to be restored.

The processor 50 may display only authorized change information $CHI_m$ (or an authorized initial operation program $OP_0$) in the selection image SIM described above. Specifically, upon detecting an abnormality, the processor 50 refers to an authorization flag F1 of each of the pieces of change information $CHI_m$ indicating changes $CH_m$ made before the most recent change $CH_n$ in the change history data HIS stored in the storage 52.

Then, the processor 50 generates a selection image SIM displaying only pieces of change information $CHI_m$ (and the initial operation program $OP_0$), which are assigned the authorization flag F1. For example, in the case of the example of Table 1, the processor 50 generates a selection image SIM displaying only the initial operation program $OP_0$ (with version information of "VER.000"), the change information $CHI_1$ (with version information of "VER.001"), and the change information $CHI_2$ (with version information of "VER.002"), to which the authorization flag F1 are assigned.

Then, the processor 50 functions as the input receiving unit 64 to receive the input IPs to select the operation program $OP_0$, the change information $CHI_1$, or the change information $CHI_2$ displayed in the selection image SIM. According to this configuration, the operator A2 can immediately identify pieces of change information $CHI_m$ (or the initial operation program $OP_0$) authorized in the past and can select one to be restored from the pieces of authorized change information $CHI_m$ (or the initial operation program $OP_0$).

The processor 50 may display only pieces of change information $CHI_m$ (or the initial operation program $OP_0$) for which no abnormality has been detected in the past in the selection image SIM described above. Specifically, upon detecting an abnormality during execution of an operation program $OP_n$, the processor 50 assigns an abnormality flag F2 indicating that an abnormality has been detected as accompanying information about the change information $CHI_n$ corresponding to the executed operation program $OP_n$ in the change history data HIS stored in the storage 52. An example of such change history data HIS is shown in Table 2 below.

TABLE 2

| Program Name | Version Information | Time | Stored Data | Authorization Flag | Abnormality Flag |
|---|---|---|---|---|---|
| PRG-XYZ001 | VER.003 | 2021 Oct. 5 | $CHD_3$ | x | ○ |
| PRG-XYZ001 | VER.002 | 2021 Aug. 30 | $CHD_2$ | x | x |
| PRG-XYZ001 | VER.001 | 2021 Aug. 15 | $CHD_1$ | ○ | x |
| PRG-XYZ001 | VER.000 | 2021 Jun. 1 | $OP_0$ | ○ | ○ |

In the example shown in Table 2, "○" shown in the "abnormality flag" column indicates that an abnormality flag F2 indicating that an abnormality has been detected is assigned, whereas "x" in the "abnormality flag" column indicates that no abnormality flag F2 is assigned (or a flag indicating that no abnormality has been detected is assigned).

For example, in the example of Table 2, an abnormality flag F2 (i.e., "abnormality flag" is "○") is assigned to the change information $CHI_3$ indicating the third change $CH_3$ corresponding to "VER.003", thereby indicating that an abnormality has been detected during execution of an operation program $OP_3$ to which the change $CH_3$ has been made.

On the other hand, an abnormality flag F2 (i.e., "abnormality flag" is "x") is assigned to the change information $CHI_1$ indicating the first change $CH_1$, thereby indicating that no abnormality has been detected during execution of the operation program $OP_1$ subjected to the change $CH_1$. The processor 50 can refer to the presence or absence of an abnormality flag F2 ("○" or "x") for each piece of the change information $CHI_n$ (and the initial operation program $OP_0$) stored in the change history data HIS to determine whether or not an abnormality has been detected for the operation program $OP_n$ corresponding to each piece of the change information $CHI_n$.

Upon detecting an abnormality during execution of the operation program $OP_n$, the processor 50 assigns an abnormality flag F2 as accompanying information about the change information $CHI_n$ of the operation program $OP_n$ under execution (or about the initial operation program $OP_0$). For example, in the case where the execution information EI includes version information $VER_n$, the processor 50 may refer to, upon detecting an abnormality during execution of the operation program $OP_n$, the version information $VER_n$ included in execution information EI of the operation program $OP_n$ and assign an abnormality flag F2 as accompanying information about change information $CHI_n$ corresponding to the version information $VER_n$ (or about the initial operation program $OP_0$). In this manner, the processor 50 can create change history data HIS as shown in Table 2.

Then, the processor 50 displays only pieces of change information $CHI_m$ (or the initial operation program $OP_0$) for which no abnormality has been detected in the selection image SIM described above. Specifically, the processor 50 refers to the abnormality flag F2 of each of the pieces of change information $CHI_m$ indicating changes $CH_m$ made before the most recent change $CH_n$ in the change history data HIS stored in the storage 52.

Then, the processor 50 generates a selection image SIM displaying only pieces of change information $CHI_m$ (and the initial operation program $OP_0$), which are assigned no abnormality flag F2. For example, in the case of the example of Table 2, the processor 50 detects an abnormality during execution of the operation program $OP_3$ to which the most recent change $CH_3$ has been made and assigns an abnormality flag F2 to the change information $CHI_3$ indicating the third change $CH_3$ corresponding to "VER.003" in the change history data HIS.

In this case, the processor 50 refers to the abnormality flag F2 of each of the initial operation program $OP_0$ (version information "VER.000"), the change information $CHI_1$ indicating the first change $CH_1$ (version information "VER.001"), and the change information $CHI_2$ indicating the second change $CH_2$ (version information "VER.002") which are prior to the most recent change $CH_3$ in the change history data HIS.

In the example of Table 2, because no abnormality flag F2 is assigned to the change information $CHI_1$ and $CHI_2$, the processor 50 generates a selection image SIM displaying only the change information $CHI_1$ and $CHI_2$. The processor 50 then functions as the input receiving unit 64 to receive an input IPs for selecting the change information $CHI_1$ or $CHI_2$ displayed in the selection image SIM.

According to this configuration, the operator A2 can immediately identify pieces of change information $CHI_m$ (or an initial operation program $OP_0$) for which an abnormality has been detected in the past and can select one to be restored from the pieces of change information $CHI_m$ (or the initial operation program $OP_0$) for which no abnormality has been detected.

The processor 50 may combine the authorization flag F1 and the abnormality flag F2 to extract change information $CHI_m$ (or the initial operation program $OP_0$) to be displayed in the selection image SIM from the change history data HIS. For example, the processor 50 extracts change information $CHI_m$ (or the initial operation program $OP_0$) satisfying a condition that an authorization flag F1 be assigned and no abnormality flag F2 be assigned (i.e., "authorization flag"="○" AND "abnormality flag"="x") from the change history data HIS.

For example, in the case of the example of Table 2, the processor 50 extracts the change information $CHI_1$ (with version information of "VER.001") as change information satisfying the condition. The processor 50 generates a selection image SIM displaying only the change information $CHI_1$ extracted in this way. According to this configuration, the operator A2 can selectively restore an operation program $OP_m$ that satisfies a plurality of conditions such as the presence/absence of authorization and the presence/absence of abnormality detection.

The processor 50 may automatically restore an operation program $OP_m$ in accordance with a predetermined condition CT without receiving an input IPs to the selection image SIM from the operator A2. For example, a condition such as the latest one of the pieces of change information $CHI_m$, which indicate changes $CH_m$ made before the most recent change $CH_n$ and to which an authorization flag F1 is assigned and no abnormality flag F2 is assigned, can be set as the condition CT.

Upon detecting an abnormality, the processor 50 extracts change information $CHI_m$ that satisfies the condition CT from the change history data HIS in accordance with the condition CT without generating the selection image SIM. Then, the processor 50 may automatically restore an operation program $OP_m$ corresponding to the extracted change information $CHI_m$ based on the change history data HIS and supply the restored operation program $OP_m$ to the communication apparatus 42 (e.g., the control device 24) through the communication network 18.

In the embodiments described above, the teaching device 26 may send an authorization request to the preventive maintenance device 14 together with the change information $CHI_n$ described above. This authorization request is for prompting the operator A2 of the preventive maintenance device 14 to authorize the change information $CHI_n$ and includes, for example, image (or sound) data displaying text "A change has been made to the operation program. Please authorize this change".

Upon receiving the authorization request, the processor 50 of the preventive maintenance device 14 displays the image (or sound) included in the authorization request on the display device 58 (or outputs it through a speaker). According to this configuration, the operator A2 of the preventive maintenance device 14 can reliably identify that a change $CH_n$ has been made to the operation program $OP_n$, which is to be checked for the authorization.

The change information $CHI_n$ described above may further include, as accompanying information, identification information (such as an ID number) of the operator A1 who has made the change $CH_n$, the reason for change, and an identification number (such as a product number) of the teaching device 26 used for the change $CH_n$. In this case, the processor 50 of the preventive maintenance device 14 may store such identification information and reason for change in the change history data HIS.

The above embodiments have been described with respect to the case where the teaching device 26 gives the version information $VER_n$ to the operation program $OP_n$. However, the present disclosure is not limited to this and the processor 50 of the preventive maintenance device 14 may give the version information $VER_n$ to the operation program $OP_n$.

Specifically, when an initial operation program $OP_0$ is created, the teaching device 26 supplies the created operation program $OP_0$ to the preventive maintenance device 14, via the communication network 18, together with accompanying information including a program name NM, a program creation time t3, and the like. The processor 50 of the preventive maintenance device 14 gives initial version information $VER_0$ (e.g., "VER.000") to the acquired operation program $OP_0$ and stores it in the storage 52 as the change history data HIS described above.

Upon making a change $CH_n$ to an operation program $OP_{n-1}$ and updating it to an operation program $OP_n$, the teaching device 26 generates change information $CHI_n$ that includes accompanying information such as a program name NM and a change time t4 and change content data $CHD_n$ to the preventive maintenance device 14. Upon acquiring the change information $CHI_n$, the processor 50 of the preventive maintenance device 14 gives new version information $VER_n$ to the operation program $OP_n$ to which the change $CH_n$ indicated by the change information $CHI_n$ has been made and stores it in the storage 52 as the change history data HIS.

Tables 1 and 2 described above are examples, and any number of rows of change information $CHI_n$ may be stored in the change history data HIS and any parameters (e.g., the reason for the change described above) may be stored in the change history data HIS in addition to (or instead of) "version information", "time", "stored data", and "authorization flag".

The above embodiments have also been described with respect to the case where the processor 50 refers to the version information $VER_n$ or the change time t4 accompanying the change information $CHI_n$ to retrieve the most recently acquired change information $CHI_n$ from the change history data HIS for (step S6). However, the present disclosure is not limited to this, and instead of (or in addition to) the version information $VER_n$ or the change time t4, any information capable of identifying the chronological order in which the change $CH_n$ has been made may accompany the change information $CHI_n$. For example, the processor 50 may assign a number to change information $CHI_n$ in the order in which it has been acquired and retrieve the most recent change information $CHI_n$ using the number.

The above embodiments have also been described with respect to the case where the processor 50 assigns an authorization flag F1 to the accompanying information about change information $CHI_n$ as a process of authorizing the change information $CHI_n$ in step S4. However, the present disclosure is not limited to this and the processor 50 may perform any data processing capable of identifying that change information $CHI_n$ has been authorized as a process of authorizing the change information $CHI_n$.

For example, the processor 50 may add characters or symbols indicating that authorization has been approved to the version information $VER_n$ of the change information $CHI_n$ (e.g., may change "VER.002" to "VER.002.AP") such that it can be identified that the change information $CHI_n$ has been authorized.

In this case, the processor 50 can refer to data processing executed in the authorization process of step S4 to determine in step S6 whether or not the change information $CHI_n$ has been authorized. The change information $CHI_n$ or the execution information EI is not limited to the information exemplified in the above embodiments and may include any other information.

The above embodiments have also been described with respect to the case where the management devices 70 and 80 are implemented in the preventive maintenance device 14. However, the present disclosure is not limited to this and the management device 70 or 80 may be implemented in the communication apparatus 42. For example, when the management device 70 or 80 is implemented in the control device 24, the processor and storage of the control device 24 constitute the management device 70 or 80. The processor of the control device 24 manages the operation program OP by executing the process illustrated in FIG. 3. In this case, upon executing the operation program OP, the processor of the control device 24 generates the execution information EI and determines YES in step S5.

On the other hand, when the management device 70 or 80 is implemented in the teaching device 26, the processor and storage of the teaching device 26 constitute the management device 70 or 80. The processor of the teaching device 26 manages the operation program OP by executing the process illustrated in FIG. 3. In this case, upon making the change $CH_n$ to the operation program $OP_{n-1}$ in response to the input $IPc_n$ from the operator A1, the processor of the teaching device 26 generates the change information $CHI_n$ and determines YES in step S1. The present disclosure has been described above with reference to the embodiments, but the above embodiments do not limit the invention according to the claims.

REFERENCE SIGNS LIST

10 Network system
12 Robot system

14 Preventive maintenance device
16 External apparatus
18 Communication network
20 Robot
24 Control device
26 Teaching device
50 Processor
62 Data acquiring unit
64 Input receiving unit
66 Authorization determination unit
68 Process execution unit
70, 80 Management device
72 Program restoration unit

The invention claimed is:

1. A management device configured to manage an operation program of a robot, the management device comprising a processor configured to:

acquire change information indicating a change made to the operation program, and execution information indicating that the operation program is executed to operate the robot, the change information including change content data indicating a content of the change;

receive an input which authorizes the acquired change information;

determine whether or not the change information of the operation program under execution is authorized based on the received input, when acquiring the execution information; and execute a predetermined accident-prevention process, when determining that the change information is not authorized.

2. The management device of claim 1, wherein the processor is configured to generate an alarm signal as the accident-prevention process.

3. A network system comprising:

the management device of claim 1;

the robot; and a communication apparatus communicatively connected to the robot and the management device, the communication apparatus being configured to store the operation program and supply the change information and the execution information to the management device.

4. The network system of claim 3, wherein the communication apparatus includes:

a control device configured to operate the robot in accordance with the operation program, and supply the execution information to the management device; and a teaching device configured to receive an input for the change and make the change to the operation program, the teaching device being configured to supply the change information to the management device.

5. A management device configured to manage an operation program of a robot, the management device comprising a processor configured to:

acquire change information indicating a change made to the operation program, and execution information indicating that the operation program is executed to operate the robot;

receive an input to authorize the acquired change information;

determine whether or not the change information of the operation program under execution is authorized, when acquiring the execution information; and execute a predetermined accident-prevention process, when determining that the change information is not authorized, wherein the management device comprises:

a storage configured to store, as change history data, a plurality of pieces of change information acquired by the processor each time a change is successively made to the operation program; and wherein the processor is configured to restore the operation program after a second change which is made before a first change, based on the change history data.

6. The management device of claim 5, wherein the processor is configured to:

receive a second input to select the change information indicating the second change from the change history data; and restore the operation program after the second change, in response to the input to select the change information, which is received by the processor.

7. A method of managing an operation program of a robot, the method comprising:

acquiring change information indicating a change made to the operation program, and execution information indicating that the operation program is executed to operate the robot, the change information including change content data indicating a content of the change;

receiving an input which authorizes the acquired change information;

determining whether or not the change information of the operation program under execution is authorized based on the received input, when acquiring the execution information; and executing a predetermined accident-prevention process, when determining that the change information is not authorized.

* * * * *